US010260883B2

(12) United States Patent
Ghaemi et al.

(10) Patent No.: US 10,260,883 B2
(45) Date of Patent: Apr. 16, 2019

(54) METHODS AND SYSTEMS FOR OPTIMAL GUIDANCE BASED ON ENERGY STATE APPROXIMATION

(71) Applicant: General Electric Company, Schenectady, NY (US)

(72) Inventors: Reza Ghaemi, Niskayuna, NY (US); Eric Richard Westervelt, Niskayuna, NY (US); Mark Lawrence Darnell, Grand Rapids, MI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 468 days.

(21) Appl. No.: 15/196,892

(22) Filed: Jun. 29, 2016

(65) Prior Publication Data

US 2018/0003506 A1 Jan. 4, 2018

(51) Int. Cl.
*G01C 21/10* (2006.01)
*G06F 7/64* (2006.01)
*G01C 21/20* (2006.01)

(52) U.S. Cl.
CPC ............ *G01C 21/10* (2013.01); *G01C 21/20* (2013.01); *G06F 7/64* (2013.01)

(58) Field of Classification Search
CPC ............ G01C 21/10; G01C 21/20; G06F 7/64
USPC ............................................................ 701/3
See application file for complete search history.

(56) References Cited

U.S. PATENT DOCUMENTS

| 9,442,490 | B2* | 9/2016 | Mn | G05D 1/0676 |
|---|---|---|---|---|
| 2014/0136030 | A1* | 5/2014 | Mathews, Jr. | H04B 7/18506 701/3 |
| 2014/0358415 | A1* | 12/2014 | McDonald | G05D 1/101 701/120 |
| 2015/0142221 | A1* | 5/2015 | Coulmeau | G01C 21/00 701/3 |
| 2015/0232204 | A1* | 8/2015 | Alexander | B64C 15/00 244/171.1 |
| 2015/0371544 | A1* | 12/2015 | Mere | G08G 5/0039 701/3 |

* cited by examiner

*Primary Examiner* — Tan Q Nguyen
(74) *Attorney, Agent, or Firm* — GE Global Patent Operation; Nitin Joshi

(57) ABSTRACT

A system, computer-readable medium, and a method to operate a vehicle in a manner that minimizes a cost to travel from an origin to a destination that includes finding the input to a flight control system that minimizes direct operating cost. The approach described herein employs an energy state approximation (ESA).

18 Claims, 7 Drawing Sheets

| Quantity | Value |
| --- | --- |
| $m_0$ | 135,324 lbs-m |
| $h_0$ | 2,295 feet |
| $h_c$ | 37,033 feet |
| $V_0$ | 212.00 knots |
| $V_c$ | 425.00 knots |
| $\lambda_c$ | 0.003 lbs-m/s feet |
| $V_w$ | 0 knots |

*FIG. 3B*

METHODS AND SYSTEMS FOR OPTIMAL GUIDANCE BASED ON ENERGY STATE APPROXIMATION

BACKGROUND

The field of the disclosure relates generally to flight management, more particularly, to systems, devices and method of operation for flight management and applications thereof.

Because the cost of fuel is a large share of the operating expense in commercial aviation, energy efficiency and fuel savings are driving research in aircraft design and operations. The focus is on those technologies that save fuel: aircraft and engine design, control design, and flight path planning (called flight guidance).

Present Flight Management Systems (FMS) determine constant climb, cruise, and descent speeds and constant cruise altitude to minimize Direct Operating Cost given takeoff weight and range and assuming constant thrust for climb and idle thrust for descent. These simplifying assumptions have been applied to implement practical systems, but the simplifications yield suboptimal performance and compromised fuel savings.

What is needed is systems and methods that improve the optimization problem for all phases of flight without simplifying assumptions and using numerical methods to achieve guidance closer to optimum.

BRIEF DESCRIPTION

In one aspect, the optimization problem is reformulated for flight activity without simplifying assumptions and using modern numerical methods to achieve guidance closer to optimum. In one embodiment, a method for optimizing vehicle guidance to minimize direct operating cost of a prescribed mission can include obtaining a mathematical model of a vehicle motion; eliminating fast dynamic state variables in the mathematical model; deriving a reduced-order mathematical model of the vehicle motion as a set of Differential Algebraic Equations that represent the slow dynamic states and includes mass as a slow state variable; determining quasi steady-state operating points within a flight envelope for the prescribed mission by solving the reduced-order model for thrust, drag, and fuel flow at uniform intervals of energy; generating a record of the quasi steady-state operating points with energy as an independent input variable and thrust, drag and fuel flow as dependent output variables; selecting speed as a control variable and using methods of optimal control to define a Hamiltonian function as direct operating cost per energy unit; at uniform intervals of energy, using a numerical method to determine the speed that minimizes the Hamiltonian function for a fixed energy per interval; constructing an optimal quasi-steady speed-energy trajectory based on the minimized Hamiltonian function and a corresponding velocity-altitude state trajectory derived therefrom using the reduced-order equations of motion; determining an optimal flight path angle to depart from the velocity-altitude state trajectory and terminate at a prescribed target cruise state; integrating backward from the target cruise state using an approximate weight and the previously-determined optimal flight path angle to define a departure point where the state trajectory intersects the velocity-altitude state trajectory; and generating an optimal guidance solution that includes the velocity-altitude state trajectory from a predetermined initial position to the departure point and the state trajectory from the departure point to the target cruise state, which is determined by the target cruise speed and altitude.

In one embodiment, a system. In yet another example embodiment, a tangible medium may implement at least some aspects of the methods of the present disclosure

DRAWINGS

These and other features, aspects, and advantages of the present disclosure will become better understood when the following detailed description is read with reference to the accompanying drawings in which like characters represent like parts throughout the drawings, wherein:

FIGS. 3A and 3B show results of a Energy State Approximation (ESA) method trial according to one example embodiment;

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the accuracy and precision of an instrument for measuring the value. Here and throughout the specification and claims, range limitations may be combined and/or interchanged, such ranges are identified and include all the sub-ranges contained therein unless context or language indicates otherwise.

Most Flight Management Systems in service today generally determine constant climb, cruise, and descent speeds and constant cruise altitude to minimize Direct Operating Cost given takeoff weight and range and assuming constant thrust for climb and idle thrust for descent. Many simplifying assumptions are applied in the conventional systems.

Figure 1:
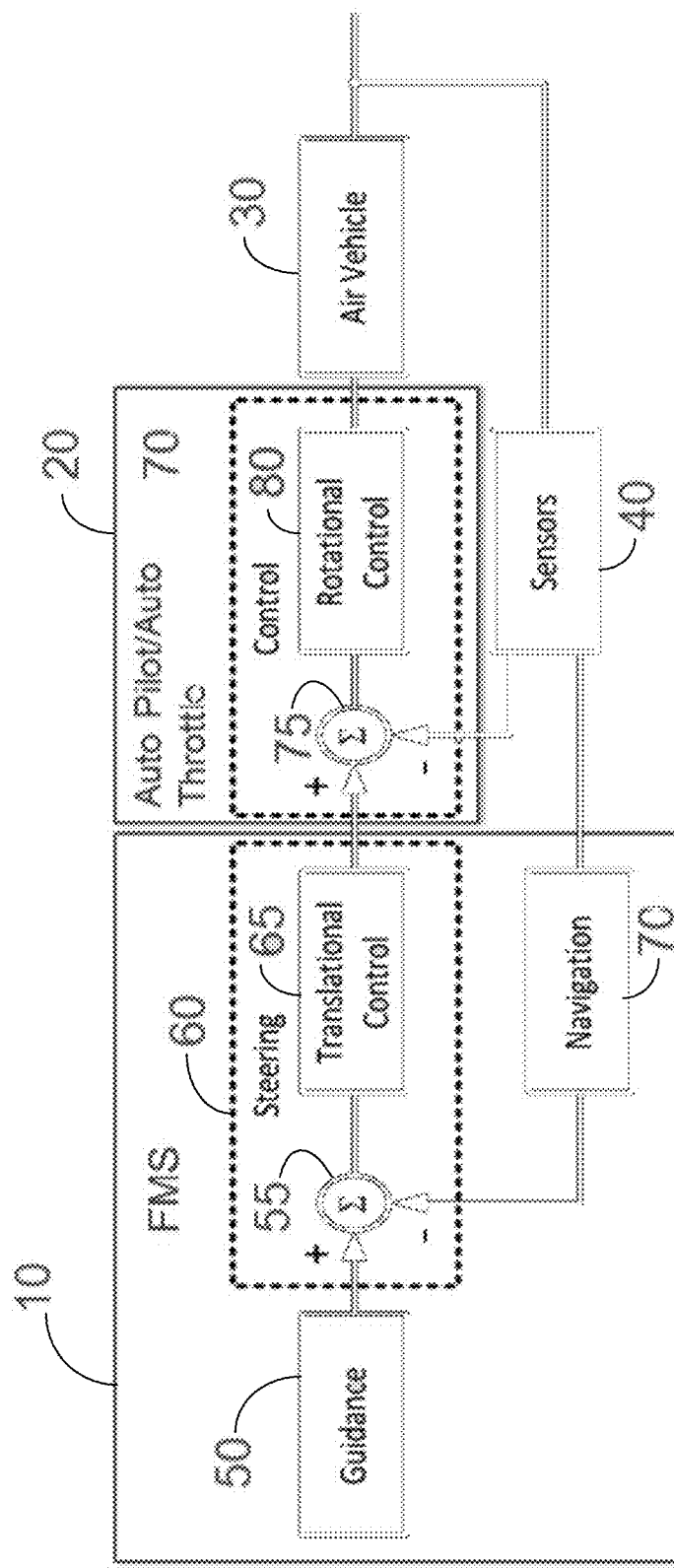
FIG. 1 shows one example embodiment of a diagrammatic perspective of a Flight Management System for guidance and navigation according to one embodiment.

Referring to FIG. 1, an illustrative depiction of one example system for guidance and navigation of vehicles, such as aircraft, is depicted. The Flight Management System 10 is coupled to an auto pilot unit 20 that is used to control operations of the vehicle 30. There are a multitude of sensors 40 that are used to measure certain properties of the vehicle and/or the environment and operational parameters.

The Flight Management System 10 includes a guidance section 50, steering module 60, and navigation unit 70. The sensor data is fed to a navigation unit 70, which then feeds the Flight Management System summation block 55 which also receives inputs from the guidance section 50 for feedback control of the vehicle 30. In one example, the guidance section 50 of the present system optimizes the open-loop control and minimizes direct operating costs. The output of the summation section 55 is fed to the translational control 65. The translational control 65 provides legacy feedback and control policies.

The output of the Flight Management System 10 is coupled to the auto pilot and auto throttle section 70. In more particular detail, the output from the translational control 65 is an input to the summation unit 75, which also receives data from the sensors 40. The summed output from the auto pilot summation unit 75 is used as an input for the rotational control 80 that is then output to the actuators that operate aerodynamic control surfaces for controlling the vehicle 30.

According to one embodiment the present disclosure reformulates the optimization problem for climbing flight (1) without simplifying assumptions and (2) using modern numerical methods to achieve guidance closer to optimum performance.

The present description considers optimum performance for climbing flight. Namely, for a given cruise altitude and speed, determine the optimal flight path that starts at a prescribed initial altitude, speed, and weight and burns less fuel when compared to any other trajectory that starts at the same initial condition and terminates at the same cruise altitude and speed—and traverses the same horizontal distance.

The method developed and detailed herein is based on an Energy State Approximation (ESA) approach. The Energy State Approximation (ESA) method is derived from a method based on Pontryagin's Minimum Principle approach where specific Energy is the independent variable and other states are considered to be a function of the specific energy. The approach is used by Erzberger and Bryson where Pontryagin's Minimum Principle is employed to find an approximation of the optimal flight profile. The approach disclosed herein uses, in some embodiments, the ESA method to approximate part of an optimal flight path that is referred to herein as a singular arc, on which partial flight path's angle (neither maximum nor minimum flight path angle) is the optimal profile. In some embodiments, the complete optimal climb profile includes: 1.) an optimal arrival on the singular arc from an initial altitude and velocity, 2.) moving on the singular arc, and 3.) an optimal departure from the singular arc and arrival at a target altitude and velocity.

The problem formulation and design of the method assumed that the fast dynamics be at steady state conditions and only includes the slow dynamics, to reduce the order of the system. With this assumption, as the result, the set of differential equations of motion corresponding to fast dynamics become a set of Algebraic Differential Equations (ADE) and enables greater sample interval. This states that elements of slow dynamics are altitude, distance, weight and energy. The admissible control is defined by a number of variables including: Airspace restrictions, Vehicle performance, Ride quality limits, and control may be further limited by Auto Pilot and Auto Throttle.

Figure 2A:
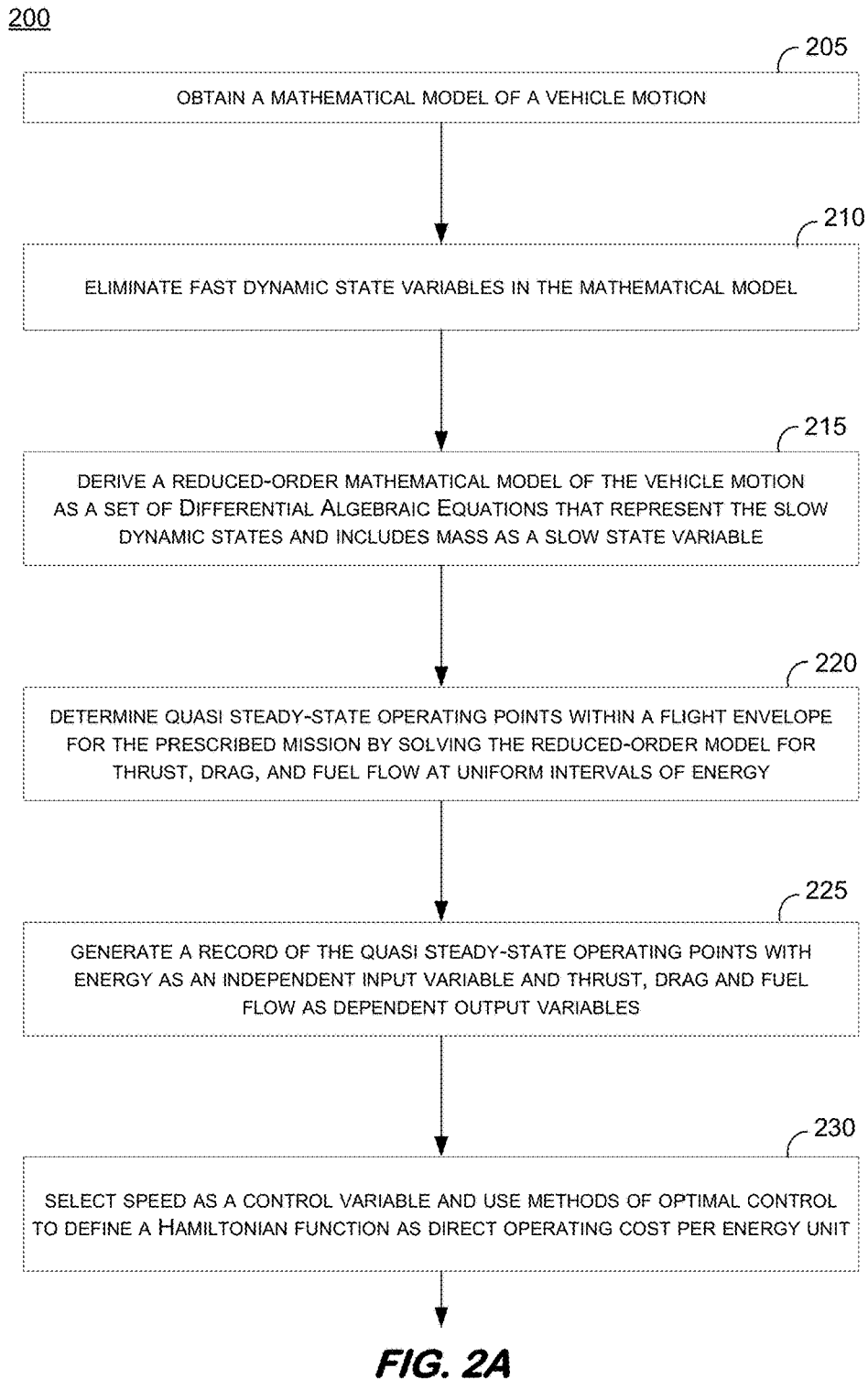
FIGS. 2A and 2B illustrate one example of a flow diagram of a process according to one embodiment.

FIG. 2 is an illustrative flow diagram of a process in one example embodiment of the present disclosure. At operation 205, a mathematical model of motion for a vehicle is obtained. The vehicle may be a fixed wing aircraft where the mathematical model is a representation of the performance characteristics for the aircraft including the specific engine configuration thereof. At operation 210, fast dynamic state variables in the mathematical model are eliminated. Continuing to operation 215, a reduced-order mathematical model of the vehicle motion is derived as a set of differential algebraic equations. The set of differential algebraic equations represent the slow dynamic states and includes mass as a slow state variable.

At operation 220, quasi-steady state operating points within a flight envelope are determined for the prescribed mission of the aircraft by solving the reduced-order model for a number of parameters. The parameters can include thrust, drag, and fuel flow at uniform interval of energy. Continuing to operation 225, a record of the quasi-steady state operating points may be generated with energy as an independent input variable and the thrust, drag, and fuel flow as dependent output variables. At operation 230 of FIG. 2A, speed is selected as a control variable and methods of optimal control are used to define a Hamiltonian function as a direct operating cost per energy unit.

Figure 2B:
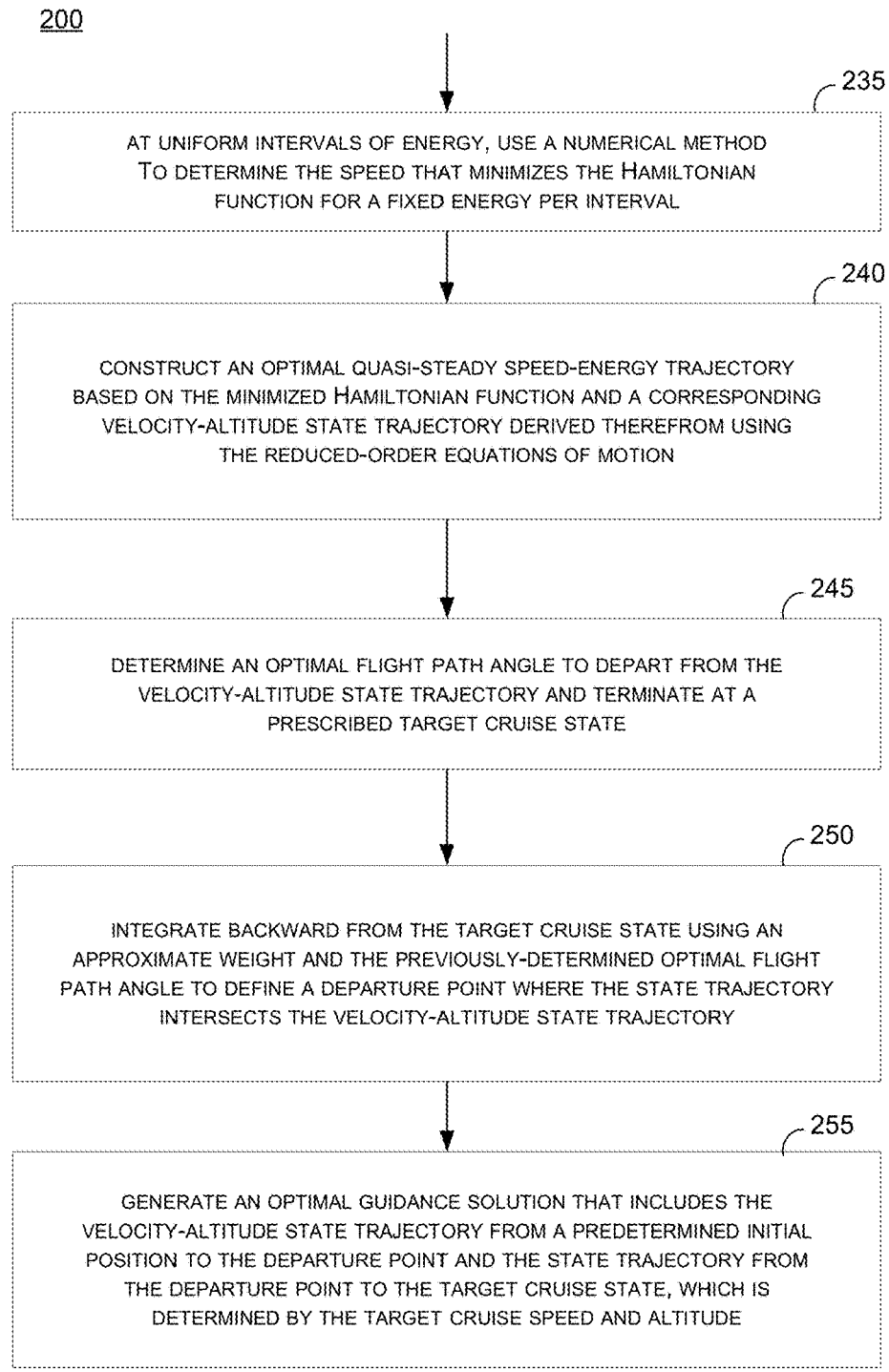

Process 200 continues as illustrated in FIG. 2B. In FIG. 2B, operation 235 includes using, at uniform intervals of energy, a numerical method to determine the speed that minimizes the Hamiltonian function for a fixed energy per interval. Based on the minimized Hamiltonian function determined at operation 235, an optimal quasi-steady speed-energy trajectory is constructed at operation 240. A corresponding velocity-altitude state trajectory is derived from the optimal quasi-steady speed-energy trajectory using the reduced-order equations of motion. This velocity-altitude state trajectory is referred to herein as the singular arc.

At operation 245, an optimal flight path angle to depart from the velocity-altitude state trajectory (i.e., singular arc) and terminate at a prescribed target cruise state is determined. Process 250 includes integrating backward from the target cruise state using an approximate weight for the aircraft and the previously determined optimal flight path angle to define a departure point where the state trajectory intersects the velocity-altitude state trajectory. Continuing to operation 255, process 200 concludes with generating an optimal guidance solution that includes the velocity-altitude state trajectory from a predetermined initial position to the departure point and the state trajectory from the departure point to the target cruise point state, which is determined by the target cruise speed and altitude.

Figure 3A:
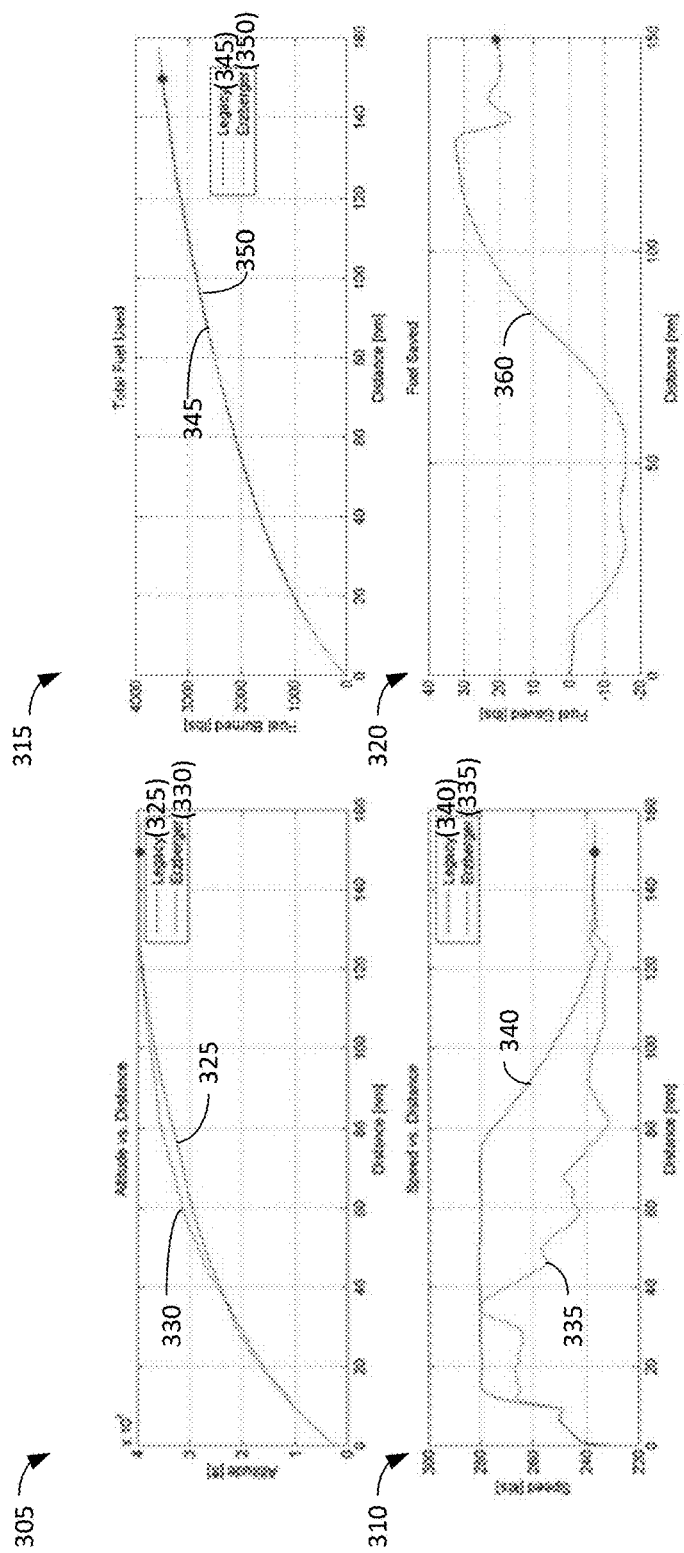

Referring to FIG. 3A, the simulated results of one ESA trial are depicted. Graph 305 is an altitude vs. distance graph including plots for both a legacy trajectory 325 and an Erzbeger based trajectory 330, where each arrives at the same target altitude. Graph 310 is a speed vs. distance graph including plots for both the legacy trajectory 340 and the Erzbeger based trajectory 335, where each arrives at the same target speed. Graph 315 shows the total fuel burned as a function of distance traveled for both the legacy trajectory 345 and the Erzbeger based trajectory 350, whereas graph 320 shows the fuel saved in relation to the distance traveled for the ESA trial by the plot 360. Some of the parameters and their corresponding values for the one ESA trial of FIG. 3 as listed in table 365. FIG. 3B is a table listing some of the parameters and their corresponding values used in the example trial of FIG. 3A. Some advantages of the ESA method herein is that the processing therein is highly efficient computationally and less sensitive to data that is not smooth.

Figure 4:
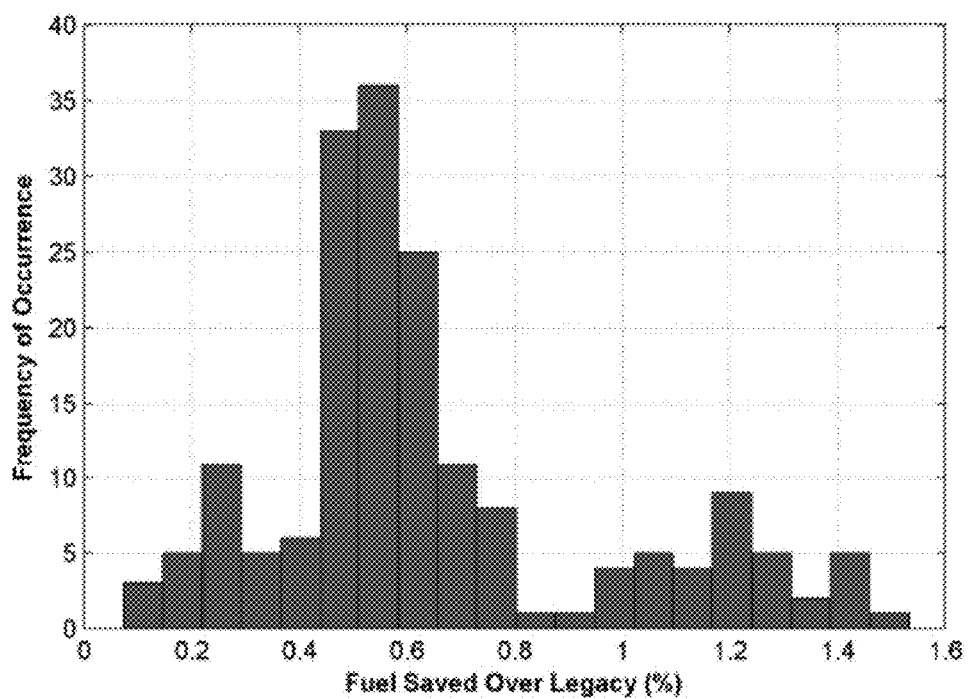
FIG. 4 illustrates one example embodiment of a comparison of the fuel saved as an average of the ESA method relative to a legacy constant speed method according to an embodiment.

As shown in FIG. 4 in graph 400, the disclosed ESA method was simulated and found to provide, in one example simulation, an average of 0.66% fuel savings. This outcome was assessed in about 180 simulation trials with five different routes of different ranges that included variable takeoff weight and wind as well as different terminal (cruise) altitude and Mach number. Such a percentage fuel savings, when considered over the numerous flights that occur, can represent a tremendous savings to the airline industry. It is noted that fuel savings is one example of a metric that can be used to quantify a benefit and improvement that may be realized by the processes and systems disclosed herein. Additional, other, and alternative metrics may be used to quantify other improvements and/or benefits, in combination or alone, by some embodiments of the process and systems disclosed herein, The design procedure consists of three steps: modeling the plant, designing the optimization routine, and assessing the value of the design. First, a nonlinear, time-variant model of the vehicle such as an aircraft is developed. The equations of motion for a rigid body with 6 degrees of freedom (6 DOF) are derived in terms of the aerodynamic and thrust forces and moments and the vehicle mass properties. Since optimum performance is the focus, the equations that define the aerodynamic and thrust forces are not derived, and thus are given. For this analysis, the vehicle is aircraft that employ aircraft engines.

To simplify the optimization problem, the system equations define the motion of the vehicle in the longitudinal plane. There is no loss of generality with this approach since the steady lateral motion of all stable fixed-wing airplanes is the same, and thus lateral performance may be studied independently. Motion in the longitudinal plane is defined by setting the derivatives of the lateral and directional motion variables to zero. Also, since the vehicle operates within the atmosphere at subsonic speeds, a flat, non-rotating earth is assumed.

The resulting equations consist of fast and slow vehicle dynamics. Assuming the fast dynamics have a negligible effect on fuel savings, the fast dynamics are eliminated, and the result is a set of reduced-order Algebraic Differential Equations that represent only the slow vehicle dynamics. This approach enables a larger time step for numerical integration compared to the time increment required if fast dynamics are included. With the reduced order model, the independent variable is changed from time to altitude.

In the second step, a Hamiltonian function is created as a function of Energy and velocity and parametrized by cruise velocity and fuel flow.

To validate the method as the third step, the fuel burned using guidance by the legacy FMS is compared to the fuel burned using the improved, more optimal control. The 6 DOF model is used to measure the performance achieved tracking each guidance solution. A consideration for assessing the fuel savings is the difference in horizontal distance where the top-of-climb occurs for each guidance solution.

At each energy level, the Golden Section Search method is used to find the speed that minimizes the Hamiltonian as a function of energy. Since the solver does not compute derivatives in the search to find a minimum, this method is more efficient and robust. However, the control in some cases may be suboptimal due to the state approximation. Accordingly, the fuel savings achieved by each method is compared to determine any penalty introduced by the ESA.

One embodiment of the present disclosure is to operate an air vehicle in a manner that minimizes the cost to fly from an origin to a destination. Hence, the requirement is to find the input to the flight control system that minimizes Direct Operating Cost (DOC). The approach described herein is based on the calculus of variations and Pontryagin's Minimum Principle. One example describes how optimal control theory is applied to formulate and solve the performance optimization problem. According to this method, the system equations are appended to a cost function by LaGrange multipliers. Thus, one example first derives the system equations of motion which are then used to formulate the problem.

In some regards, as fuel is burned and the weight of the airplane changes, a best cruise altitude for optimal operating efficiencies for the airplane also changes. Unfortunately, operating airplanes in this manner is not typically feasible due to the limited capabilities of the air traffic control system. Instead, to make the problem of separating aircraft and managing traffic flow tractable, aircraft are assigned constant cruise altitudes as a practical compromise between efficiency and safety. Accordingly, the Instrument Flight Rules that commercial airplane operators must comply with require a climb from the departure airport to an assigned constant cruise altitude, where the airplane operates until it must descend to arrive at the destination airport. The mission of a commercial transport is thus characterized by climb, cruise, and descent flight phases. More specifically, a flight can be broken down into a set of sequential phases that consist of takeoff, climb, cruise, descent, approach, and landing. The airplane motion on the ground to and from the runways is called taxiing and is termed ground operations.

The control of the airplane during the takeoff, approach, and landing phases is typically dictated by traffic flow and safety in the terminal area, and thus precise control according to specific procedures is required. During these phases, the pilot has effectively little or no discretion in how the airplane is operated to minimize cost such as fuel burn. Therefore, performance optimization is possible for the climb, cruise, and descent phases only, where the pilot has more discretionary control according to the Instrument Flight Rules (IFR).

The Instrument Flight Rules may be expressed as constraints on the vehicle state and control variables, as follows:

Climb—The aircraft ascends from the initial point of the climb phase with monotonically increasing altitude until it reaches the assigned cruise altitude and speed.

Cruise—The aircraft flies level at the assigned, constant cruise altitude. The initial cruise speed is the value in the FAA-approved (cleared) flight plan.

Descent—The aircraft descends with monotonically decreasing altitude until it reaches the initial point of the approach phase.

Steady cruise at a constant altitude is not optimum since the weight of the aircraft changes due to fuel burn. However, according to the Instrument Flight Rules, an assigned constant cruise altitude is the primary means of assuring aircraft separation and scheduling traffic flow.

The ultimate objective is an optimization system that determines the control history that yields the minimum Direct Operating Cost (DOC) of the entire climb, cruise, and descent mission while satisfying the IFR and vehicle performance constraints. Note, however, the cost of the cruise phase is dependent on the climb and descent performance and vice versa. Thus, the interdependence of the climb, cruise, and descent performance should be considered to determine the optimal control for the complete climb, cruise, and descent mission. That is, the optimal control for the mission cannot be determined by independently optimizing the performance in each phase.

Accordingly, the climb optimization problem is formulated assuming the optimum cruise altitude and speed are determined a priori, and thus the initial cruise state is applied as a terminal constraint on the climb. At first this approach may seem contradictory since the optimum cruise altitude and speed are a function of weight at the start of cruise, and thus the optimum cruise state is dependent on the amount of fuel burned during climb. Indeed, with the problem formulated in this manner, an iterative method is required to find the optimum combination of climb and cruise controls. Note, however, that the cruise is first dependent on the climb. That is, the iterative method begins with a prediction of the climb to a first estimate of the cruise altitude. The initial cruise weight is then determined by the fuel burned during the first climb prediction.

In the end, once the optimum combination of climb and cruise controls is determined by iteratively converging on the cruise weight, the climb optimization is expressed with the cruise state as a terminal constraint. Consequently, the approach set forth herein for defining the climb optimization is valid. In fact, the climb optimization algorithm developed is integrated with the method for finding the optimum cruise control—as well as the method for finding the optimum descent control—to determine the optimum control for the entire climb, cruise, and descent flight cycle.

For the Energy State Approximation (ESA) Method, several features include: it is derived from Erzberger method based on Pontryagin's Minimum Principle; speed and thrust (throttle lever angle) control certain variables; independent variable changed from time to specific energy; Golden Section search method finds the minimum.

Problem Formulation and Design for the method have the following attributes: fast dynamics assumed to have negligible effect on fuel consumption; the set of differential equations of motion becomes a set of Differential Algebraic Equations; enables greater sample interval. The Admissible control defined by: Airspace restrictions; Vehicle performance; Ride quality limits; Control may be further limited by Auto Pilot and Auto Throttle.

Certain advantages of the Energy State method disclosed herein might include being very efficient computationally and less sensitive to data that is not smooth.

The present system may reduce the fuel consumption of fixed-wing aircraft by calculating the control history and state trajectory that minimizes fuel consumption. According to one example embodiment, the control history is generated through the following steps: 1—Derive a model of the aircraft and the engine. 2—Verify that the model matches the experimental data. 3—Project the model onto the vertical plane so that it defines motion in the longitudinal plane only. 4—Eliminate the fast dynamics by setting the pitch moment and the vertical forces to equilibrium values. 5—Form the reduced-order model as a Differential Algebraic Equations, where algebraic equations replace the fast dynamics. 6—Through an off-line process, determine steady-state operating points within the flight envelope by solving the reduced-order model (equations of motion) for thrust, drag, and fuel flow given uniform intervals of altitude, velocity, mass, and engine deterioration and save the results in a table where altitude, velocity, mass, and engine deterioration are the independent variables and thrust, drag and fuel flow are the outputs. Choose the velocity as the input and construct the Hamiltonian as a function of the input (velocity) and the independent variable (specific energy). 7—Use energy as the independent variable. 8—For a fixed energy, use the Golden Section method to find the velocity that minimizes the Hamiltonian. 9—Construct the velocity-energy profile and consequently velocity-altitude profile, and call it singular arc. 10—Determine the optimal flight path angle to depart from singular arc and reach the target state. The flight path angle is maximum or minimum if the target state is below or above the singular arc. 11—Integrate backward from the target state and an approximate weight with optimal flight path angle determined in step 10 until it hits the singular arc, the point of intersection of the two trajectories on velocity-altitude profile is called point of departure. 12—The optimal path slides on the singular arc until it reaches to the point of departure, from there, the optimal path slides on the trajectory determined in step 11 till it reaches to the target state, which is determined by the target speed and target velocity.

This system enables the generation of flight paths that minimize fuel consumption. The performance of this method compared with other, known methods is superior in that it achieves lower fuel consumption. In one example the technical effects of the present techniques have the following advantages over other methods as follows: 1—is computationally inexpensive which makes it suitable for real-time implementation; 2—unifies the engine and aircraft model to increase fuel saving; 3—relaxes the assumption that the speed is constant over cruise and descent to achieve fuel saving; 4—is able to embed the wind profile in the optimization; 5—includes the engine deterioration as a parameter so that the flight path may be shaped to maximize fuel savings given the actual state of engine deterioration; 6—includes mass as a state in the optimization and therefore relaxes the assumption that mass is constant over the flight.

In order to demonstrate the concept, a simulation was performed that involved developing a detailed model of narrow-body commercial aircraft engines. Generation of the optimal flight path for the aircraft as detailed herein with some changes to the departure part. The generated flight path using the detailed model was flown via the simulation and the fuel consumption was measured during the climb phase. The flight path was also generated by an in-service system using the detailed model. A 1% fuel saving was observed in the simulated climb phase which is considered significant for the industry.

While the present system and method was described in terms of an aircraft, other vehicles can employ the techniques for other vehicles such as ships, trains, and automotive vehicles.

Exemplary embodiments of methods, systems, and apparatus for flight management are not limited to the specific embodiments described herein, but rather, components of systems and/or steps of the methods may be utilized independently and separately from other components and/or steps described herein. For example, the methods may also be used in combination with other flight management systems, and are not limited to practice with only the systems and methods as described herein.

Figure 5:
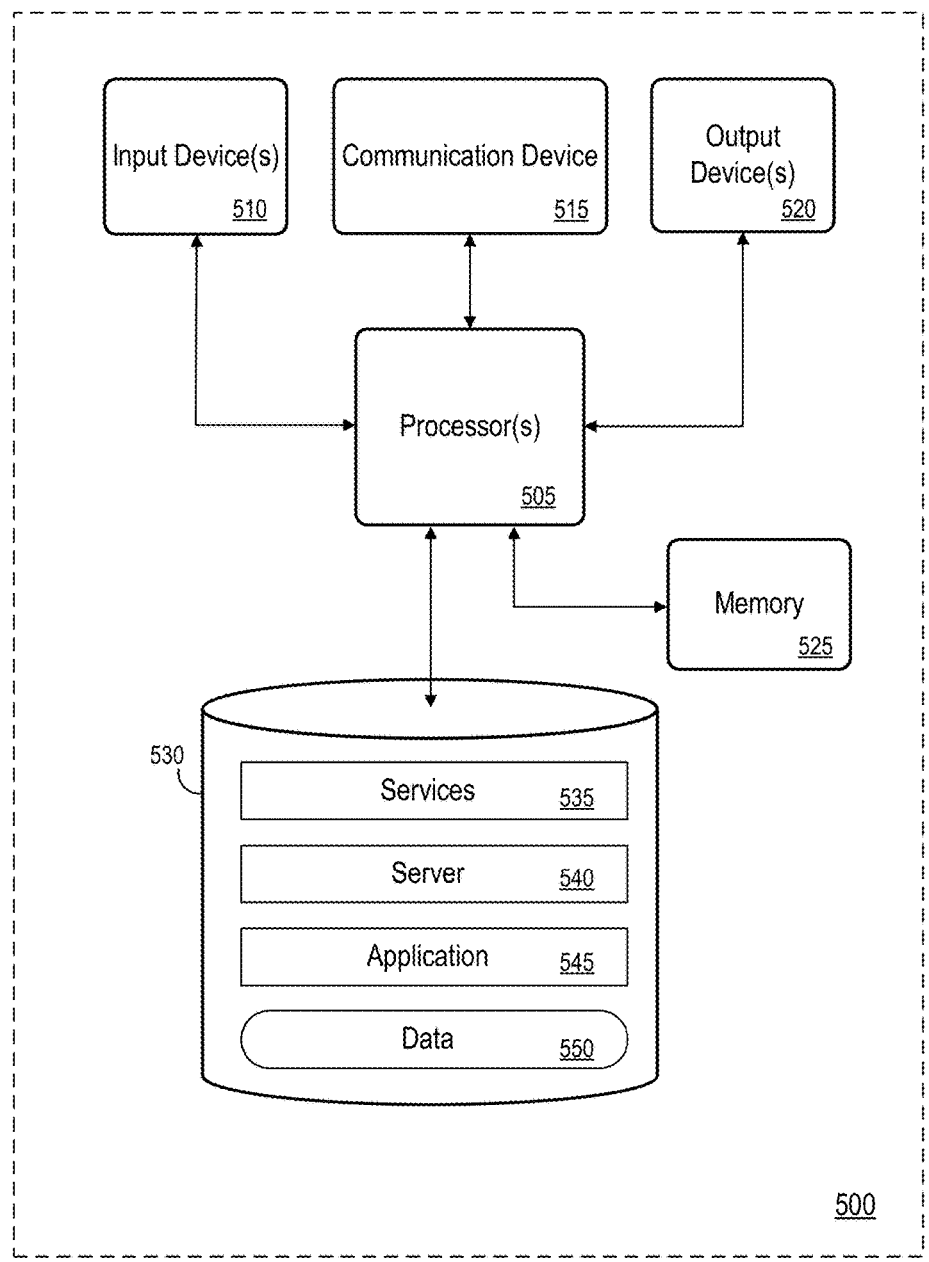
FIG. 5 depicts one illustrative example of a block diagram of a system or device that can execute processes disclosed herein, in one example embodiment.

FIG. 5 is an illustrative block diagram of apparatus 500 according to one example of some embodiments. Apparatus 500 may comprise a computing apparatus and may execute program instructions to perform any of the functions described herein. Apparatus 500 may comprise an implementation of server, a dedicated processor-enabled device, and other systems, including aircraft deployed systems and systems deployed in a ground-based control center or facility, in some embodiments. Apparatus 500 may include other unshown elements according to some embodiments.

Apparatus 500 includes processor 505 operatively coupled to communication device 515, data storage device 530, one or more input devices 510, one or more output devices 520 and memory 525. Communication device 515 may facilitate communication with external devices, such as a reporting client, or a data storage device. Input device(s) 510 may comprise, for example, a keyboard, a keypad, a mouse or other pointing device, a microphone, knob or a switch, an infra-red (IR) port, a docking station, and/or a touch screen. Input device(s) 510 may be used, for example, to enter information into apparatus 500. Output device(s) 520 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory.

Services 535, server 540, and application 545 may comprise program instructions executed by processor 505 to cause apparatus 500 to perform any one or more of the processes described herein, including but not limited to process 200. Embodiments are not limited to execution of these processes by a single apparatus.

Data 550 (either cached or a full database) may be stored in volatile memory such as memory 525. Data storage device 530 may also store data and other program code for providing additional functionality and/or which are necessary for operation of apparatus 500, such as device drivers, operating system files, etc.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed includes:

1. A method for optimizing vehicle guidance to minimize direct operating cost of a prescribed mission, the method comprising:
   obtaining a mathematical model of a vehicle motion;
   eliminating fast dynamic state variables in the mathematical model;
   deriving a reduced-order mathematical model of the vehicle motion as a set of Differential Algebraic Equations that represent the slow dynamic states and includes mass as a slow state variable;
   determining quasi steady-state operating points within a flight envelope for the prescribed mission by solving the reduced-order model for thrust, drag, and fuel flow at uniform intervals of energy;
   generating a record of the quasi steady-state operating points with energy as an independent input variable and thrust, drag and fuel flow as dependent output variables;
   selecting speed as a control variable and using methods of optimal control to define a Hamiltonian function as direct operating cost per energy unit;
   at uniform intervals of energy, using a numerical method to determine the speed that minimizes the Hamiltonian function for a fixed energy per interval;
   constructing an optimal quasi-steady speed-energy trajectory based on the minimized Hamiltonian function and a corresponding velocity-altitude state trajectory derived therefrom using the reduced-order equations of motion;
   determining an optimal flight path angle to depart from the velocity-altitude state trajectory and terminate at a prescribed target cruise state;
   integrating backward from the target cruise state using an approximate weight and the previously-determined optimal flight path angle to define a departure point where the state trajectory intersects the velocity-altitude state trajectory; and
   generating an optimal guidance solution that includes the velocity-altitude state trajectory from a predetermined initial position to the departure point and the state trajectory from the departure point to the target cruise state, which is determined by the target cruise speed and altitude.

2. The method of claim 1, wherein the motion of the vehicle represented by the mathematical model is defined solely in a longitudinal plane by setting lateral and directional motion variables to zero.

3. The method of claim 1, wherein the mathematical model of the vehicle motion comprises an accurate model of the vehicle aerodynamic forces and moments and mass properties and a physics-based model of the engines that represent the thrust forces and fuel flow.

4. The method of claim 1, wherein the fast dynamic state variables are eliminated by setting the pitch moment and vertical forces to equilibrium values.

5. The method of claim 1, wherein the thrust, drag, and fuel flow for the reduced-order model are functions of altitude, velocity, mass, and engine efficiency.

6. The method of claim 1, wherein the optimal flight path angle at which the velocity-altitude state trajectory is departed to arrive at cruise altitude and velocity is a maximum or a minimum depending on whether the target cruise state is below or above the velocity-altitude state trajectory, respectively.

7. The method of claim 1, wherein the target cruise state is based on a target cruise speed and altitude.

8. The method of claim 1, wherein the energy includes the parameters of altitude, velocity, mass, and engine efficiency.

9. The method of claim 1, wherein the Hamiltonian function has velocity as a control input and energy as an independent variable.

10. A non-transitory computer-readable medium storing processor executable instructions, the medium comprising:
    instructions to obtain a mathematical model of a vehicle motion;
    instructions to eliminate fast dynamic state variables in the mathematical model;
    instructions to derive a reduced-order mathematical model of the vehicle motion as a set of Differential Algebraic Equations that represent the slow dynamic states and includes mass as a slow state variable;

instructions to determine quasi steady-state operating points within a flight envelope for the prescribed mission by solving the reduced-order model for thrust, drag, and fuel flow at uniform intervals of energy;

instructions to generate a record of the quasi steady-state operating points with energy as an independent input variable and thrust, drag and fuel flow as dependent output variables;

instructions to select speed as a control variable and using methods of optimal control to define a Hamiltonian function as direct operating cost per energy unit and;

instructions to, at uniform intervals of energy, use a numerical method to determine the speed that minimizes the Hamiltonian function for a fixed energy per interval;

instructions to construct an optimal quasi-steady speed-energy trajectory based on the minimized Hamiltonian function and a corresponding velocity-altitude state trajectory derived therefrom using the reduced-order equations of motion;

instructions to determine an optimal flight path angle to depart from the velocity-altitude state trajectory and terminate at a prescribed target cruise state;

instructions to integrate backward from the target cruise state using an approximate weight and the previously-determined optimal flight path angle to define a departure point where the state trajectory intersects the velocity-altitude state trajectory; and instructions to generate an optimal guidance solution that includes the velocity-altitude state trajectory from a predetermined initial position to the departure point and the state trajectory from the departure point to the target cruise state, which is determined by the target cruise speed and altitude.

11. The medium of claim 10, wherein the motion of the vehicle represented by the mathematical model is defined solely in a longitudinal plane by setting lateral and directional motion variables to zero.

12. The medium of claim 10, wherein the mathematical model of the vehicle motion comprises an accurate model of the vehicle aerodynamic forces and moments and mass properties and a physics-based model of the engines that represent the thrust forces and fuel flow.

13. The medium of claim 10, wherein the fast dynamic state variables are eliminated by setting the pitch moment and vertical forces to equilibrium values.

14. The medium of claim 10, wherein the thrust, drag, and fuel flow for the reduced-order model are functions of altitude, velocity, mass, and engine efficiency.

15. The medium of claim 10, wherein the optimal flight path angle at which the velocity-altitude state trajectory is departed to arrive at cruise altitude and velocity is a maximum or a minimum depending on whether the target cruise state is below or above the velocity-altitude state trajectory, respectively.

16. The medium of claim 10, wherein the target cruise state is based on a target cruise speed and altitude.

17. The method of claim 10, wherein the energy includes the parameters of altitude, velocity, mass, and engine efficiency.

18. The medium of claim 10, wherein the Hamiltonian function has velocity as a control input and energy as an independent variable.

\* \* \* \* \*